(12) United States Patent
Stanfill (10) Patent No.: US 8,866,817 B2
(45) Date of Patent: Oct. 21, 2014

(54) COMPUTER-AIDED PARALLELIZING OF COMPUTATION GRAPHS

(75) Inventor: Craig W. Stanfill, Waltham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 13/295,206

(22) Filed: Nov. 14, 2011

(65) Prior Publication Data

US 2012/0056888 A1 Mar. 8, 2012

Related U.S. Application Data (62) Division of application No. 10/873,681, filed on Jun. 22, 2004, now Pat. No. 8,059,125.

(60) Provisional application No. 60/482,391, filed on Jun. 25, 2003.

(51) Int. Cl.
*G06F 9/45* (2006.01)

(52) U.S. Cl.
CPC ........................................ *G06F 8/45* (2013.01)
USPC ......................................................... 345/440

(58) Field of Classification Search
CPC .................................................................. G06F 8/45
USPC .......................................................... 345/505
See application file for complete search history.

(56) References Cited

U.S. PATENT DOCUMENTS

| | | |
|---|---|---|
| 4,953,106 A | 8/1990 | Gansner et al. |
| 5,088,034 A | 2/1992 | Ihara et al. |
| 5,117,489 A | 5/1992 | Komori et al. |
| 5,151,991 A | 9/1992 | Iwasawa et al. |
| 5,313,584 A | 5/1994 | Tickner et al. |
| 5,347,639 A | 9/1994 | Rechtschaffen et al. |
| 5,446,915 A | 8/1995 | Pierce |
| 5,475,842 A | 12/1995 | Gilbert et al. |
| 5,680,634 A * | 10/1997 | Estes ............................... 712/15 |
| 5,682,537 A | 10/1997 | Davies et al. |
| 5,794,065 A | 8/1998 | Hatakeyama et al. |
| 5,799,149 A | 8/1998 | Brenner et al. |
| 5,813,004 A | 9/1998 | Meck et al. |
| 5,819,021 A | 10/1998 | Stanfill et al. |

(Continued)

FOREIGN PATENT DOCUMENTS

| | | |
|---|---|---|
| EP | 0600601 | 6/1994 |
| JP | 2007-529041 | 10/2007 |
| WO | WO009723826 | 7/1997 |
| WO | WO0042518 | 7/2000 |

OTHER PUBLICATIONS

Affidavit Pursuant to 37 C.F.R. § 1.56 signed by inventor Craig W. Stanfill, dated Apr. 21, 2009.

(Continued)

*Primary Examiner* — Jeffery A Brier
(74) *Attorney, Agent, or Firm* — Fish & Richardson P.C.

(57) ABSTRACT

An approach to automatically specifying, or assisting with the specification of, a parallel computation graph involves determining data processing characteristics of the linking elements that couple data processing elements of the graph. The characteristics of the linking elements are determined according to the characteristics of the upstream and/or downstream data processing elements associated with the linking element, for example, to enable computation by the parallel computation graph that is equivalent to computation of an associated serial graph.

10 Claims, 3 Drawing Sheets

(56) References Cited

U.S. PATENT DOCUMENTS

| | | |
|---|---|---|
| 5,870,743 A | 2/1999 | Cohen et al. |
| 5,909,681 A | 6/1999 | Passera et al. |
| 5,935,216 A | 8/1999 | Benner et al. |
| 5,956,704 A | 9/1999 | Gautam et al. |
| 5,966,072 A | 10/1999 | Stanfill et al. |
| 5,999,729 A | 12/1999 | Tabloski, Jr. et al. |
| 6,016,150 A | 1/2000 | Lengyel et al. |
| 6,064,393 A | 5/2000 | Lengyel et al. |
| 6,088,716 A | 7/2000 | Stanfill et al. |
| 6,205,465 B1 | 3/2001 | Schoening et al. |
| 6,253,371 B1 | 6/2001 | Iwasawa et al. |
| 6,266,804 B1 | 7/2001 | Isman |
| 6,311,265 B1 | 10/2001 | Beckerle et al. |
| 6,330,008 B1 | 12/2001 | Razdow et al. |
| 6,415,286 B1 | 7/2002 | Passera et al. |
| 6,480,876 B2 | 11/2002 | Rehg et al. |
| 8,059,125 B2 | 11/2011 | Stanfill |
| 2002/0080181 A1 | 6/2002 | Razdow et al. |
| 2005/0034112 A1 | 2/2005 | Stanfill |

OTHER PUBLICATIONS

Afrati et al., "Performance Considerations on a Random Graph Model for Parellel Processing", Informatique Theorique et Applications, vol. 27, No. 4, pp. 367-388, (1993).

Apers et al., "Prisma/DB: A Parallel, Main Memory Relational DBMS", IEEE, pp. 541-554 (1992).

Bodin et al., "A User Level Program Transformation Tool", ACM, pp. 180-187 (1998).

Bischof, Christian et al., "Hierarchical Approaches to Automatic Differentiation," 1996, pp. 1-13.

Boral et al., "Prototyping Bubba: A Highly Parallel Database System", IEEE, vol. 2, No. 1 pp. 4-24, (Mar. 1990).

Braun, Peter, "Parallel Program Debugging Using Scalable Visualization",IEEE, pp. 699-708 (1995).

DeWitt et al., "The Gamma Database Machine Project", IEEE, vol. 2, No. 1, pp. 44-62, (Mar. 1990).

Graefe et al., "Encapsulation of Parellelism and Architecture Independence in Extensible Database Query Execution", IEEE, vol. 19, No. 8, pp. 749-764 (Aug. 1993).

Graefe, Goetze "Volcano—An Extensible and Parellel Query Evaluation System", IEEE, vol. 6, No. 1, pp. 120-135 (Feb. 1994).

Li et al., "Load Balancing Problems for Multiclass Jobs in Distributed/Parellel Computer Systems", IEEE, vol. 47, No. 3, pp: 322-332, (Mar. 1998).

Reiter, Raymond, "Scheduling Parallel Computations." Journal of the ACM (JACM), vol. 15, Issue 4, Oct. 1968, pp. 590-599.

Rim et al., "An Efficient Dynamic Load Balancing Using the Dimension Exchange Method for Balancing Quantized Loads on Hypercube Multiprocessors", IEEE, pp. 708-712 (1999).

Samanta et al., "Load Balancing for Multiprojector Rendering Systems", ACM, pp. 107-116 (1999).

Stanfill, Craig, "Massively Parallel Information Retrieval for Wide Area Information Servers", IEEE, pp. 679-682 (1991).

Stanfill, Craig, "The Marriage of Parallel Computing and Information Retrieval", IEEE, (2003).

Tamassia, Roberto et al., "Automatic Graph Drawing and Readability of Diagrams," IEEE Transactions on Systems Man and Cybernetics, vol. 18, Issue 1, Jan./Feb. 1988, pp. 61-79.

Yasrebi, Mehrad et al., "On a Methodology for the Design and Evaluation of a Class of Application-Oriented Parallel Computer Architectures," Canadian Conference on Electrical and Computer Engineering, vol. 2, Sep. 14-17, 1993, pp. 861-869.

Decision of Rejection, with English Translation, JP Application No. 2012-083817, mailed Sep. 2, 2013, 4 pages.

\* cited by examiner

COMPUTER-AIDED PARALLELIZING OF COMPUTATION GRAPHS

CROSS-REFERENCE TO RELATED APPLICATIONS

This application is a divisional application of and claims the benefit of U.S. application Ser. No. 10/873,681, filed Jun. 22, 2004 (which issue issued as U.S. Pat. No. 8,059,125 on Nov. 15, 2011), and claims the benefit of U.S. Provisional Application 60/482,391, filed Jun. 25, 2003, each of which is incorporated herein by reference.

BACKGROUND

This invention relates to parallel processing of data and more particularly to computer-aided specification of parallel computation graphs.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS.

Figure 1A:
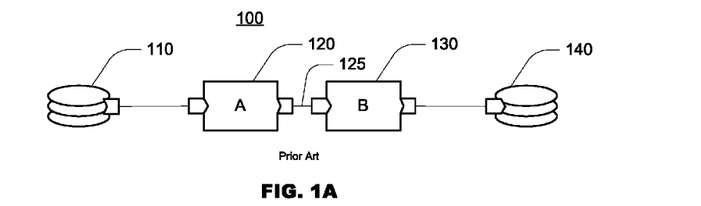
FIG. 1A is a serial computation graph.

Referring to FIG. 1A, an example of a computation graph 100 includes an input file 110 and an output file 140. Input file 110 is the source of a series of work elements, such as data records each associated with a separate transaction in a transaction processing system. Each work element is first processed by a component A 120, passed over a serial link 125, and then processed by a component B 130. The outputs of component B are stored in output file 140.

Figure 1B:
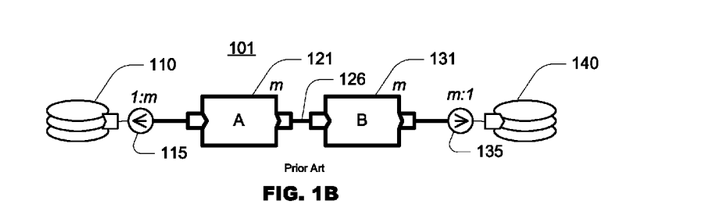
FIG. 1B is a parallelized computation graph.

It can be desirable to implement a computation graph using multiple instances of individual components. For example, each instance of a component may be hosted on a different processor, thereby achieving a coarse-grain parallelism that provides an overall increase in computation capacity. Referring to FIG. 1B, a specification of a parallelized computation graph 101 includes input file 110 and output file 140 as in the serial computation graph 100. A parallel component A 121 represents m instances of component A 120 arranged in parallel, and a parallel component B 131 represents m instances of component B 130 represented in parallel. A parallel link 126 joins parallel component A 121 and parallel component B 131. In the representation of parallel computation graphs, such as the one in FIG. 1B, parallel components are indicated using bold lines, and optional indicators of the degrees of parallelism (e.g., "m" in FIG. 1B) adjacent to the components.

Figure 1C:
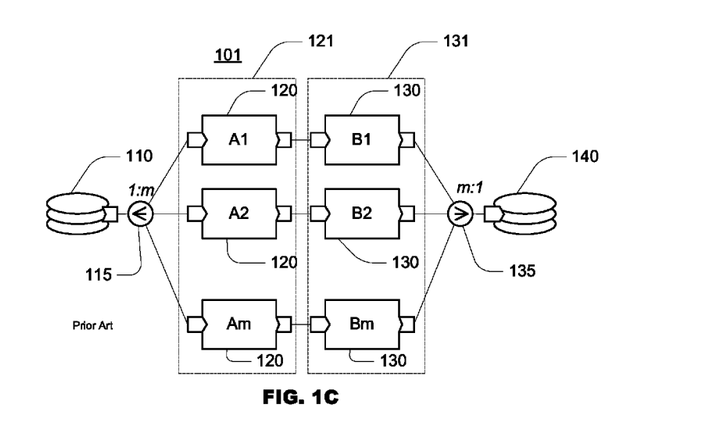
FIG. 1C is a serial representation of the parallelized computation graph shown in FIG. 1B.

Referring to FIG. 1C, parallelized computation graph 101 is represented in explicit serial form, with m instances of component A 120 (labeled A1 through Am) arranged in parallel. In order to distribute work elements from input file 110, a 1:m partition element 115 is inserted between input file 110 and the m instances of component A that make parallel component A 121, which includes the m instances of component A 120. Partition element 115 takes work elements on one input, and sends each input to one of the m outputs, for example, in a round-robin manner. A m:1 gather element 135 takes the outputs of the m component Bs 130 on m input lines and merges the inputs, for example according to their arrival times, for output to output file 140. The partition element 115 and gather element 135 provide similar functionality in the example of FIG. 1B, though the multiple instances represented by the parallel components are not explicit in FIG. 1B as they are in FIG. 1C. Parallel link 126 shown in FIG. 1B is represented in this example of FIG. 1C as a parallel combination of serial links joining corresponding instances of component A and component B.

SUMMARY

In one aspect, in general, the invention features a method for automatically specifying a parallel computation graph. A specification of a first computation graph is accepted. The graph has data processing elements that are joined by linking elements and each linking element is associated with an upstream data processing element and a downstream data processing element. For each of one or more of the linking elements, data processing characteristics of the linking element are determined according to the characteristics of the upstream and/or downstream data processing elements associated with the linking element.

Each data processing element can be represented as a vertex, and each linking element can be represented as an arc, of the computation graph.

In another aspect, in general, the invention features an automated approach to specifying a computation graph with one or more parallel components. The approach includes using metadata characterizing input requirements for a data flow of a downstream parallel component and specifying at least one functional element for processing the data flow to satisfy the input requirements of the downstream parallel component.

The functional elements can include a partition element. A partition element can include, for example, a hash partition element, a round-robin partition element, or a broadcast element.

A functional element can include a gather element, which can also include a sorting element.

An interconnection network can link the functional elements.

The approach can also include determining characteristics of an output data flow of a component based on metadata for the component. These characteristics can also or in addition be based on characteristics of one or more of the input flows for the component. Determining the characteristics of the output flow can include applying one or more rules, and/or can include executing one or more procedural statements.

In another aspect, in general, the invention features a method for parallelizing a computation graph. A specification of the computation graph is accepted. The computation graph includes a first component and a second component coupled by a link. A specification of a degree of parallelism of the first component and/or of the second component is also accepted. An inter-component link that corresponds to the serial link is formed having parallel characteristics based at least upon the specified degree of parallelism.

In another aspect, in general, the invention features a computer implemented method for parallelizing a serial computation graph. The method includes repeated applications of steps including: (a) mapping characteristics of input flows to a component of the parallelized graph into characteristics of one or more output flows of that component, (b) determining characteristics for functional elements that implement a link between two components based on required input characteristics of a component that accepts data from that link, and (c) determining the characteristics of an input flow of a component based on characteristics of an output flow from another component upstream and determined characteristics of functional elements of a link joining that other upstream component and the component.

In another aspect, in general, the invention features an approach to implementing flows of data that are sorted according to a sort order in which, in addition to the sorted data, one or more indicators related to the sort order are passed on the flows. At least some of the indicators identify a place in the sort order for the data such that subsequent data on the flow occurs no earlier than the identified place in the sort order.

Aspects of the invention can have one or more or the following advantages:

A serial computation graph can be parallelized without any, or with limited, input from a user, thereby simplifying the process of designing a parallelized computation graph.

The automated procedure is less error prone because the automated system can verify the input requirements of components in the graph are satisfied rather than relying on a user to satisfy the input requirements.

Aspects of the invention involve technical considerations related to guaranteeing the functional equivalence of a parallel computation graph and an initial serial (or parallel) computation graph. A technical effect is that the computations specified by a serial computation graph can be distributed for parallel execution on a number of separate processors, thereby increasing the throughput of the parallel execution as compared to serial execution.

Other features and advantages of the invention are apparent from the following description, and from the claims.

DESCRIPTION

Referring to FIGS. 1A-1C, serial computation graph 100 shown in FIG. 1A, which is an example of a simple computation graph, can in some circumstances be implemented as parallel computation graph 101 shown in FIGS. 1B-1C. For example, if each work element from input file 110 can be processed independently of all other work elements, then a parallel computation graph 101 will perform the same computations as serial computation graph 100. Note that although the same computations are performed the order of the work elements received by output file 140 is not necessarily the same in serial graph 100 as in parallel graph 101. In this example, the order of output work elements is not critical to the function of the computation network.

Depending on characteristics of component A 120, a particular type of partition element 115 may be required to divide up the input elements for processing in the various instances of component A. For example, if computation graph 100 is for processing transaction records that are each associated with a particular account, then in order that the parallel computation graph be functionally equivalent to the serial graph, it may be required that all records for any particular account be processed by a common instance of component A 120. Such a requirement is satisfied in serial graph 100 because there is only one instance of component A 120. In parallel graph 101, the requirement that all records for a particular account go to a common instance of component A is not guaranteed for some forms of 1:m partition element 115, such as for a round-robin partition element. In this example, a suitable partition element 115 maps the value of the account field in each record according to a hash function into m different values, each associated with one on the outputs of partition element 115. Records that yield any particular hash value are all sent to the same output, and therefore are processed by a common instance of component A 120 in parallel graph 101. Such a 1:m partition element 115 is referred to as a hash partition element. The hash function is designed so that on average, a balanced number of records are sent to each of the outputs of partition element 115.

In specifying a parallel computation graph 101 based on a serial computation graph 100, a user transforms a specification of the serial graph to preserve a desired function of the serial graph. For example, for the serial graph shown in FIG. 1A, the user can specify the degree of parallelism (m) for components A 120 and B 120 (in this example both have the same degree of parallelism), add partition element 115 and gather element 135 into the graph, and specify the characteristics of the added elements. For example, if component A 120 requires records partitioned according to an account number, the user recognizes the requirements of component A 120 and manually configures partition element 115 to divide the records according to a hash value of the account number.

In general, depending on the characteristics of component A 120, the user specifying partition element 115 may choose among various types of partition elements. These types of partition elements include, but are not necessarily limited to:

a hash partition element, specified by the key or keys in each work element according to which the work elements are partitioned;

a round-robin partition element, in which work elements are divided without regard to key values of the work elements, typically cycling between the different outputs; and a broadcast partition element, in which a copy of each input work element is passed to each of the outputs.

The user specifying parallel graph 101 may also have to specify the characteristics of gather element 135. For example, the input work elements may be sorted according to a key value of the work elements, such as the account number in transaction records. In serial graph 100, that order would be preserved. However, in parallel graph 101, that order may be disturbed if the different branches process their outputs at even slightly different rates. Therefore, if the order in the resulting output file 140 is to match that detained using serial graph 100, the user can specify that gather element 135 should sort its inputs according to a particular key, such as the account number, in the work elements it receives from the various branches.

Depending on the desired characteristics of the output gather element 135, and any assumptions that can be made about the input to the gather element, the user specifying the parallel graph chooses a type of gather element. The available types of gather elements include, but are not limited to:

an arbitrary gather element in which work elements are passed from input to output in an arbitrary order, for example, according to their arrival time at the gather element; and a sorted gather element in which the inputs are sorted according to a key before being passed to the output.

Referring back to FIG. 1A, there may be situations in which it is not possible to partition work elements from input file 110 in a manner that is suitable for both component A 120 and component B 130. For example, in the case of transaction records, it may be necessary to partition work elements by an account number for component A and by a payee for component B. In such cases, direct links between corresponding instances of component A and component B as shown in FIG. 1C would not in general be acceptable. Another situation in which such direct links would not be possible is when a different degree of parallelism is desired for component A than for component B. For example, if component A requires twice the resources of component B, then twice as many instances of component A could be specified, thereby making direct links between different corresponding instances of components A and B impossible.

Figure 2A:
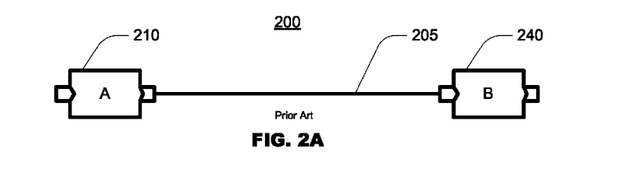
FIG. 2A is a portion of a parallelized computation graph.
Figure 2B:
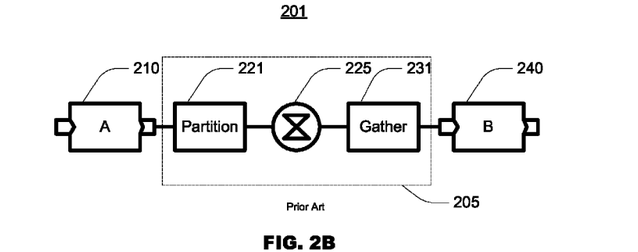
FIG. 2B is a portion of a parallelized computation graph with elements represented on an inter-component link.
Figure 2C:
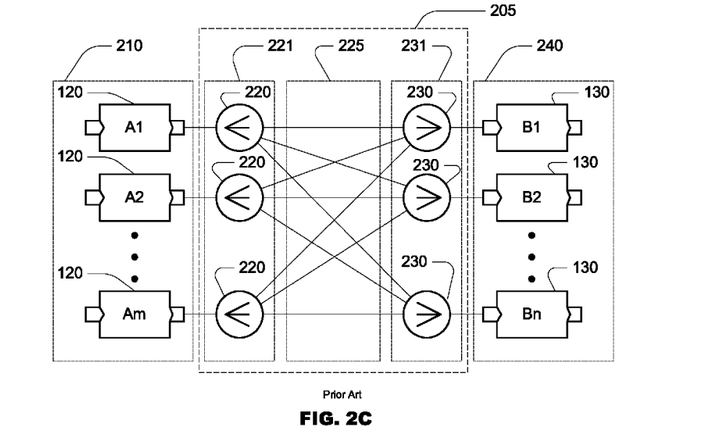
FIG. 2C is a serial representation of the portion of the parallelized computation graph shown in FIG. 2B.

Referring to FIGS. 2A-2C, in a more general example, specifying a parallel computation graph that is functionally equivalent to a serial graph is performed in several steps. FIG. 2A shows a portion of a parallel graph 200 that includes parallel components A 210 and B 240, which are linked by an inter-component link (ICL) 205. In the representation of the graph in FIG. 2A, the parallel characteristics of ICL 205 are not explicit. These characteristics are determined in this approach such that the computations performed by parallel graph 200 are equivalent to a serial graph in which components A and B have degree 1. In FIG. 2A, component A is indicated to have parallel degree m and component B is indicated to have parallel degree n, where m is not necessarily equal to n. The characteristics of ICL 205 depend on factors which can include the requirements (e.g., partitioning or ordering requirements) of the inputs of the serial instances of parallel component B 240 and/or characteristics (e.g., partitioning or sorting characteristics) of the outputs of the serial instances of parallel component A 210.

Referring to FIG. 2B, a second parallel graph 201 represents ICL 205 as a network of interconnected elements. This network provides a link between parallel component A 210 and parallel component B 240 and performs a suitable "shuffling" of work elements between the serial components that make up the parallel components such that the overall function of the graph correct. The network representation of ICL 205 performs such shuffling using a parallel partition element 221, which takes the output of parallel component A 210, an interconnection network 225, and a parallel gather element 231, whose outputs provide the inputs to parallel component B 240.

In this example, parallel component A 210 has a degree of parallelism of m, while parallel component B 240 has a parallel degree of parallelism n, which is not necessarily the same as m. The parallel link between parallel component A 210 and parallel partition element 221 represents m serial links. The output of parallel partition element 221 represents mn (m times n) serial links. Interconnection network 225 has mn inputs and mn outputs. Parallel gather element 231 has mn inputs and n outputs.

Referring to FIG. 2C, in a serial representation of the portion of parallel computation graph 201 shown in FIG. 2B, parallel partition element 221 is implemented by m instances of a partition element 220. Each of these partition elements is a 1:n partition element that is similar to the partition element 115 shown in FIGS. 1B-1C. Parallel gather element 231 is implemented by n instances of a gather element 230. Each of these gather elements is a m:1 gather element that is similar to gather element 135 in FIGS. 1B-1C. Interconnection network 225 is implemented as a cross-connection of serial links in which every instance of partition element 220 is connected to every instance of gather element 230. In some alternative representations of parallel graphs, a single symbol or icon is used to represent the combination of partition element 221 and interconnection network 225, and this combination is also referred to as "partition element".

Thus, a user specifying a network representation of ICL 205, which links parallel component A 210 and parallel component B 240 as shown in FIG. 2B specifies the characteristics of parallel partition element 221 and parallel gather element 231 (together with interconnection network 225 forming inter-component link (ICL) 205). The user chooses these characteristics based on recognizing requirements of the downstream component B 240, and on any assumptions that the user can make about the characteristics of the outputs of the instances of component A 120 that make up the upstream parallel component A 210.

As an example of specification of the characteristics of inter-component link 205, suppose that component A 210 requires work elements to be partitioned according to an account number, while component B 240 requires the outputs to be partitioned according to a postal zip code. Assuming that the inputs to components A were suitably partitioned, then the outputs of components A will also be partitioned in the same way. That is, in this example, the outputs of components A 210 in FIG. 2B will be partitioned according to account number. Each of 1:n partition elements 220 of the inter-component link is a hash partition element that uses a zip code key within each word element determine to which output to pass the work element. Work elements with the same zip code will in general have been processed by different instances of component A 210, and therefore will pass through different instances of 1:n hash element 220. The output from each 1:n hash partition element 220 that corresponds to the same hash value is passed to a common gather element 230 of the inter-component link. In this example, the order of work elements presented to component B is not important, so each gather element 230 passes work elements to a corresponding component in the order of their arrival.

An automated or computer-assisted approach to parallelizing a serial graph determines the network representation of ICL 205 and the characteristics of the overall link and the elements (e.g., partition elements) of the network representation. A user uses a graph representation as shown in FIG. 2A without necessarily considering the network structure of ICL 205 as shown in FIG. 2B. The approach adds the elements of inter-component links to accomplish essentially the same result as the approach described above without requiring a user to explicitly insert the partition, interconnect, and gather elements of the network representation of the inter-component links.

One aspect of this automated or computer-assisted approach relates to the use of information that characterizes the requirements of inputs of some or all of the components in a computation graph and a way of determining characteristics of outputs of some or all of the components. The information needed for this is stored as metadata associated with the components. This metadata is used by the automated parallelization procedures.

One or more components in a serial graph (e.g., graph 200) each includes metadata related to characteristics of each of the inputs that are required by the component. For example, if a particular input of the component is required to be partitioned in a particular way, the input metadata for that input may include an indicator according to which the key or field the work elements must be partitioned. If a component has multiple inputs, each input has separate metadata associated with it. For example, one input may indicate that copies of all work elements must be delivered to the input, while another input may indicate that the work elements must be partitioned by the account number of each work element.

Metadata characteristics for an input to a component may include one or more of:
- An indicator that if partitioned, the input must be partitioned according to a particular key or keys;
- An indicator that each instance of the component must receive copies of all work elements on its input; and
- An indicator that the input must be sorted, and the key or keys that define the sort order.

Another characterization of one or more of the components relates to characteristics of each output flow based on the characteristics of the input flows of the component and characteristics of the component itself. One example of such a characterization is for a component that processes each work element it receives on its input flow in order. For such a component, if the input work elements are sorted according to a particular key, then because there is no re-ordering within the component, the output work elements are also sorted according to that same key. Similarly, if a component receives work elements that have been partitioned according to a particular key, if the value of that key is not modified by the component, then the output work elements will remain partitioned according to that key. (Note that if the component modifies the value of the key, then the output will not longer necessarily be partitioned according to the modified value of the key.)

In general, this characterization defines a component-specific mapping function that accepts the characteristics of each of the input flows of the components, and produces characteristics for each of the output flows.

Characterizations of flows are similar to characterizations of requirements of inputs for components. In particular, a characterization of a flow can include:
- An indicator that the flow includes only a partitioned subset of the work elements, and if partitioned, the particular key or keys according to which the flow has been partitioned; and
- An indicator that the flow is sorted, and the key or keys that define the sort order.

A number of alternative ways of encoding the mapping from input characteristics to output characteristics for a component can be used. For instance, the mapping can be explicitly encoded in procedural statements associated with the component. Another way of encoding the mapping is based on indicators of which key values in work elements may be modified by the component, thereby potentially disturbing sort orders or partitioning based on that key, as well as explicit indicators regarding sorting, reordering, or partitioning that are explicitly implemented by that component. The mapping is then based on the input characteristics and these indications, for instance using a set of generic or component-specific rules. Examples of such mapping rules include the following:
- For a component with one input and one output that does not indicate that it modifies the value of a key key1, an input that is partitioned according to key1 yields an output that remains partitioned according to key1;
- For a component with one input and one output that does not indicate that it modifies the value of a key key2, an input that is sorted according to key1 and then key2 yields an output that is sorted according to key1 alone;
- A component that indicates it reorders its input work elements, an input that is sorted yields an output that does not indicate that it is sorted any more, because the component may have disturbed the sort order; and
- A component that explicitly implements a sort according to the value of a key key1 will indicate that the output is sorted according to key1 regardless of the sort order of the input.

Some components may rename fields in work elements. The metadata for such a component identifies such renaming, and the output characteristics are expressed in terms of the new named variables. For example, if the input is partitioned according to an "account" key, and the "account" field is renamed as the "customer" field, then the output is characterized as being partitioned according to the "customer" field.

Figure 3:
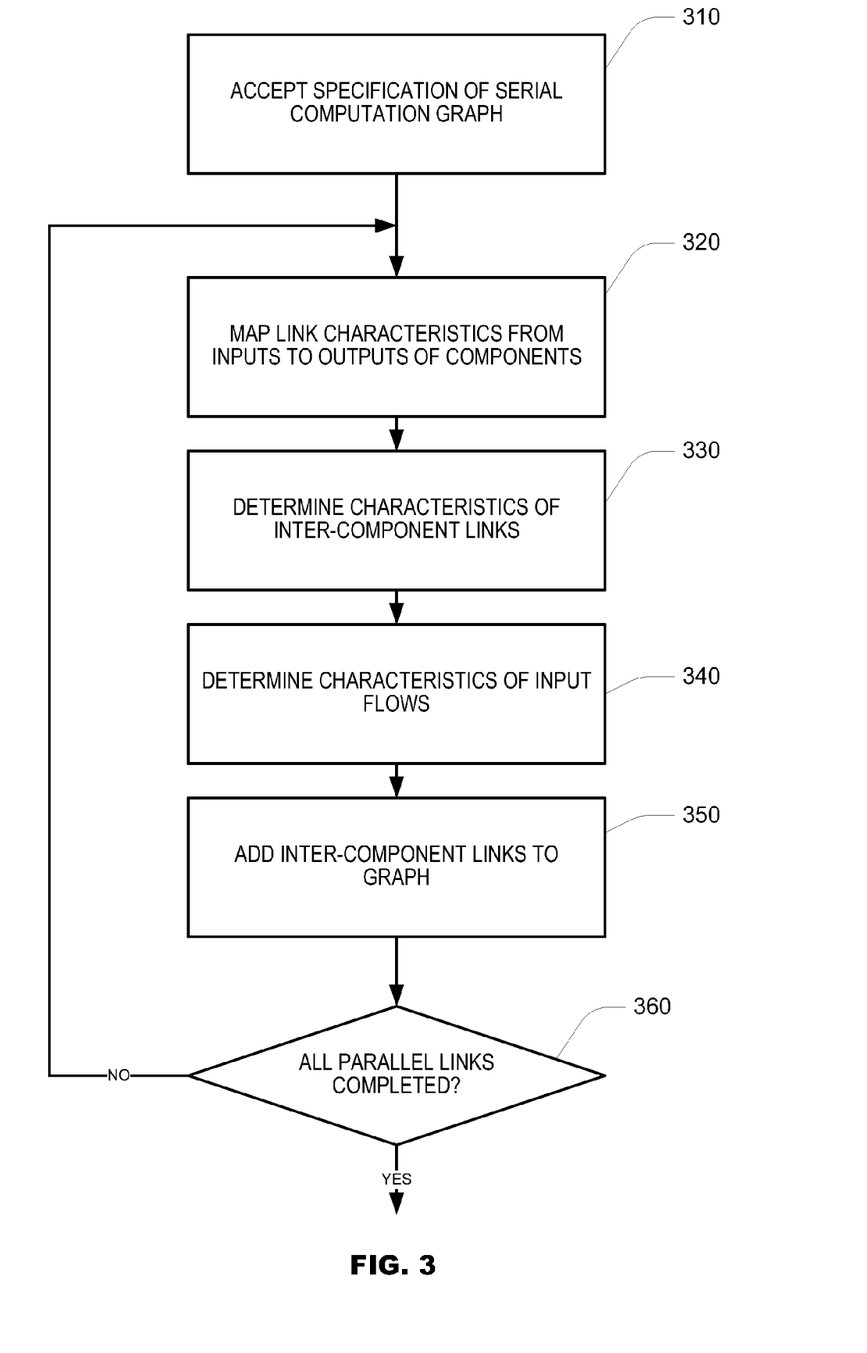
FIG. 3 is a flowchart of an automatic parallelizing procedure.

Referring to FIG. 3, an automated procedure 300 for specifying a parallel computation graph from a serial computation graph begins with accepting a specification of the serial graph to be parallelized (step 310). This specification includes a specification of the structure of the graph, also referred to as the topology of the graph, which specifies which outputs of each component are connected by flows to each input of another component. The specification also includes the metadata for each component described above: the input requirements, if any, for each input of one or more component, and the mappings between input characteristics and output characteristics for the components or other characterization of the outputs of the component. Note that this metadata is optional in that some components may not specify any input requirements, and some components may not provide a mapping that yields the characteristics of their output flows. If a component does not specify any input characteristics, the procedure does not necessarily enforce any particular characteristics for its input flows. If a component does not provide a mapping that yields characteristics of its output flows, then the procedure does not necessarily make any assumptions regarding those characteristics.

In this procedure, the user specifies the desired degree of parallelism for each of the components in the computation graph. As an example of application of this procedure, consider the simple serial computation graph 100 shown in FIG. 1A. Assume that the user specifies that component A 120 is to have m=3 parallel instances and component B 130 is to have n=5 parallel instances. In this example, input file 110 and output file 140 have a parallel degree of 1, representing physical files that support serial access.

For each link in the initial serial graph, the procedure determines the characteristics of an inter-component link (i.e., a partition element, interconnection network, and gather element) to implement the serial link in the parallel computation graph. The procedure cycles between four phases:
(a) mapping link characteristics from the inputs to the outputs of one or more components (step 320);
(b) for each inter-component link for which the characteristics of the output of the upstream component are known, determine the characteristics for the inter-component link, including for the partition element, interconnection network, and gather element of the inter-component link, based on any known requirements of the downstream inputs (step 330);
(c) for each of the inter-component links processed in step (b), determine the resulting characteristics of the input flows of the downstream components that are associated with the outputs of the inter-component link (step 340); and
(d) insert the components of the network representations of inter-component links between the corresponding components of the parallel graph (step 350).

When all the parallel links have been processed (step 360), an equivalent serial computation graph is formed by expanding each of the parallel components.

In the mapping phase of the procedure (step 320), characteristics of the one or more output flows from generally less than all of the components are calculated. For instance, on the initial iteration, the characteristics of the flows from components that have no inputs can be computed. In subsequent iterations, the mapping for any component for which the input characteristics have been computed for all the input flows for that component is used to determine the characteristics of the output flows of that component.

In the next phase (step 330), the characteristics of the partition and gather elements of one or more inter-component links are determined based on the degree of parallelism of the upstream component (m) and of the downstream component (n) of that link, the characteristics of the output flow from the upstream component, and the requirements of the input flow of the downstream component. There are several cases that can be dealt with directly:

(P1) If m=n and the input flow to the downstream component does not need to be partitioned or sorted according to any particular key, and the input flow does not need a copy of each work element, then corresponding instances of the upstream and downstream components are connected directed, as is shown in the example in FIG. 1B. Note that this essentially corresponds to degenerate forms of the partition and gather elements.

(P2) If m≠n and the input flow to the downstream component does not need to be partitioned according to any particular key, and the input flow does not need a copy of each work element, then the partition element of the inter-component link is defined to perform a round-robin distribution.

(P3) If the input flow to the downstream component requires the work elements to be partitioned according to a set of keys that is different than the partitioning of the output flow of the upstream component, the partitioning element performs a hash partition according to the required key values.

(P4) If the input flow requires a copy of each work element, then the partition element of the inter-component link is defined to perform a broadcast function.

For each of cases (P2)-(P4), there are a number of special cases related to the gather element of the inter-component link to accommodate the input flow characteristics of the downstream component:

(G1) If the input flow of the downstream component requires the input to be sorted according to a particular set of keys, and the outputs of the upstream components are sorted according to those same keys, then the gather element performs a sorted gather. In a sorted gather, the gather element assumes that the work elements on each of its inputs are sorted, and it selects which input to select next as an output according to the sort key in order to achieve a correct sort order for its output.

(G2) If the input flow of the downstream component requires the input to be sorted according to a particular set of keys, (key1, . . . , keyJ), and the outputs of the upstream components are sorted according to a set of keys (key1, . . . , keyJ, . . . keyK), then the gather element performs a sorted gather. For J=K, this reduces to special case (G1).

(G3) If the input flow requires the input to be sorted according to a particular set of keys, and the outputs of the upstream components are not sorted according to a compatible set of keys, then the gather element performs a sort.

Other forms of partition and gather elements can also be used. For example, in the case in which m=n and the downstream component does not require any particular partitioning, but does require sorting according to a particular key, corresponding upstream and downstream components can be connected by an inter-component link having only a one-input/one-output "gather" element that performs the required sort. Note that the input to the inter-component link maintains the partitioning and the inter-component link adds the sorted characteristic.

In the next phase of the cycle (step 340), the characteristics of input flows of the downstream components are determined from the characteristics of the output flows of the upstream components and the characteristics of the intervening inter-component link. Note that, in general, at least the required characteristics for the input will be present on those flows. Additional characteristics, which may be reflected in characteristics of output flows of the component, may also be present. For example, in the case where the flow was partitioned according to one key and the downstream component requires its input to be sorted on another key, the resulting flow is both partitioned and sorted, even though only sorting is required.

In the last phase of the cycle (step 350) the elements of the network representation of the inter-component link are added to the graph.

At the end of each iteration of the cycle (steps 320-350), characteristics of additional input flows to components are computed. When the initial computation graph is acyclic, this procedure terminates when all the links in the initial graph have been processed.

An approach to restarting the procedure if all links have not been processed, for instance if the characteristics of the output flow of the upstream component have not been computed, is to make no assumptions regarding the characteristics of the flow in determining the characteristics of the inter-component link. Such a restarting may be required in computation graphs that are not acyclic, or in graphs in which metadata is not available for some components. For example, even though the flow was already in fact partitioned, a redundant partition element may be inserted in the inter-component link. Although possibly inefficient, the correct functioning of the parallel graph would still be preserved.

In the automated procedure described above, the insertion of the components of the inter-component links may be explicitly indicated to the user. Alternatively, the user does not have to be aware of the nature of the inter-component links that are introduced on each of the links of the original serial computation graph. A user interface can hide these partition and gather elements, or provide for an optional display of these elements controlled by the user, rather than displaying the network representation of the inter-component links by default.

In a computer-assisted (e.g., partially automated) mode, the user guides the procedure by explicitly introducing some of the partition and gather elements. For instance, the user may specify that a particular partition and gather element, or some other form of element, be used on a parallel link before the automated procedure is applied, thereby overriding the automatic procedure for that link. In another aspect of the computer-assisted mode, the user can examine the result of the automated processing, and may modify the partition and gather elements of an inter-component link. Note that after the user has modified the link, the automated procedure optionally propagates the flow characteristics downstream from that link, and downstream changes may result in new specifications of downstream inter-component links.

In another computer-assisted mode, an automated procedure verifies that input requirements of each component are satisfied, and notifies the user if that is not the case. The user can then introduce elements to meet the input requirements, and then the system can automatically re-check the refined design. As a variant of this mode, the system may suggest modifications of the graph (for example, possible insertions of partition or gather elements on inter-component links) in order to meet the input requirements, and the user either confirms that the suggested modification be used, or provides an alternative modification (e.g., insertion of a different element, or specification of different characteristics for an inserted element).

In the parallelizing approach described above, the user chooses the specific degrees of parallelism for each of the components before applying the automatic procedure. In an alternative approach, the user only identifies which components will be parallelized, or variables associated with their degrees of parallelism, but does not necessarily specific the numerical degree of parallelism that is desired. The result is a "generic" parallel computation graph in which the characteristics of each inter-component link determined, but like the parallel components, specific realizations of the parallel elements in the network representation of the inter-component link have not yet been determined. When using specific values for the desired degrees of parallelism for the components are specified (e.g., at run-time for the graph), the generic graph is realized in a specific parallelized form.

In the parallelization approach described above, flow characteristics are propagated in what is essentially a "flooding" approach that is, the characteristics of the data flows propagate "downstream" in the same direction as the data flows themselves. Alternative approaches can be used. For example, upstream propagation may be used. A simple example of such upstream propagation can be used when there is a series of two components, A and B. If both A and B have the same degree of parallelism, and B requires partitioning according to a key, and A does not require any particular partitioning, then the partitioning requirement can be propagated upstream so that A will also require the same partitioning as B. In this way, it may be possible to use direct links between corresponding instances of A and B without introducing explicit partition and gather elements between A and B.

A component of a serial graph may also represent an entire serial subnetwork. One approach to the automatic parallelizing approach is to parallelize the subnetwork as if the serial subnetwork were fully expanded within its host graph.

In an alternative approach, the serial subnetwork is parallelized independently of the network in which it is hosted. Metadata characterizing the subnetwork as a whole, including an overall mapping of flow characteristics through the subnetwork, are computed for use during the parallelizing procedure for the host network based on the metadata for the components within the subgraph.

One type of element that may be used in the parallelized computation graphs described above is a sorted merge element. As noted above, a sorted merge element assumes that the work elements on each of its inputs are sorted according to a particular sort order and that the sorted merge element must produce an overall merged output according to the same sort order. The basic procedure that is followed by such a sorted merge element is to consider each work element that is pending at each of its inputs, and to pass through the next work element according to the sort order, as an output.

However, if there is no pending work element at any one of the inputs, the sorted merge cannot pass any work elements because it does not know whether a later arriving work element on that input will occur earlier in the sort order than the already pending inputs. The work elements would then be held up until an end-of-flow indicator is received on the link, at which time the sorted merge element can assume that no more work elements will arrive on that flow.

There may be situations in which such blocking behavior will occur in a parallelized graph. For example, suppose that the outputs of each of m instances or a component A are sorted according to a key key1 and that a downstream component B requires that its inputs be sorted according to a key key2 and partitioned according to key key1. If the partitioning of the outputs of A according to key1 is not specified by the metadata, a parallelizing approach is to use a hash partition element within an inter-component link that partitions according to key1, followed by sorted gathers that sort according to key2. However, if the outputs of components A are already hash partitioned, then for each hash partition element, only one output will receive any work elements. Also as a result, at the sorted merge elements, only a single input for each sorted merge element will receive input. This will unnecessarily block the entire flow until an end-of-flow indicator is passed from the hash partition element to the sorted merge element.

A way of avoiding this situation is for a hash partition element that receives a sorted input to repeatedly send a sort value indicator on each of its output links to indicate a value in the sort order that has been reached by at least one of its outputs. This sort value indicator signals a downstream component that no work element with an earlier value in the sort order will be provided over this link. A sorted merge element that receives such a sort value indicator uses the indicator to determine whether it can pass a pending work element from another of its inputs, for example, because it has a sort value that precedes the value in the received sort value indicator.

A sort value indicator can be sent as often as possible based on the flow of work elements through a component, or can be sent less frequently, for example, periodically according to the number of work elements processed or according to time. Sort value indicators can be sent on any sorted flow that may be partitioned, and such indicators are broadcast on the outputs of partition elements that receive the indicators.

Another solution to the problem of blocking downstream sorted merge elements is to scramble the inputs of the upstream hash partition elements so that in general, at least some work elements are passed on each of the outputs of the hash partition elements.

The automatic approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A computer-implemented method for parallelizing a serial computation graph, including:
   accepting, by a computer system, a specification of the serial computation graph, said serial computation graph including a first component corresponding to a first data processing element and a second component corresponding to a second data processing element coupled by a link, the first component having an output connected to an input of the second component by the link;
   accepting, by the computer system, a specification of a first degree of parallelism of the first component and a second degree of parallelism of the second component;
   accepting, by the computer system, a first sort key and a second sort key, the first sort key identifying a sort order of the output of the first component and the second sort key identifying a sort order of the input of the second component;
   determining, by the computer system, parallel characteristics of a specification of an inter-component link based at least upon the specification of the first degree of parallelism, the specification of the second degree of parallelism, the first sort key, and the second sort key;
   forming, by the computer system, the inter-component link that corresponds to the link, the inter-component link corresponding to a link data processing element that receives work elements from the first data processing element and distributes the work elements to the second data processing element according to the parallel characteristics;
   adding, by the computer system, the specification of the inter-component link to the specification of the serial computation graph; and
   executing, by a plurality of processors, a parallel computation according to the graph, including executing a plurality of instances of the first data processing element, a plurality of instances of the second data processing element, and the link data processing element such that the link data processing element receives work elements from the plurality of instances of the first data processing element and distributes the work elements to the plurality of instances of the second data processing element according to the inter-component link.

2. The method of claim 1 wherein the link coupling the first component and the second component is a serial link.

3. The method of claim 1, wherein the serial computation graph includes a plurality of serial links coupling components of the computation graph, and wherein the method includes forming a parallelized computation graph from the serial computation graph.

4. The method of claim 3 wherein forming the parallelized computation graph includes for each of the plurality of serial links replacing the serial link with an inter-component link having parallel characteristics.

5. The method of claim 1 wherein the link couples an output flow of the first component to an input flow of the second component.

6. The method of claim 5 wherein the inter-component link has parallel characteristics based upon at least characteristics of the output flow of the first component.

7. The method of claim 5 wherein the inter-component link has parallel characteristics based upon at least characteristics of the input flow of the second component.

8. The method of claim 1 wherein accepting the specification of the first degree of parallelism of the first component and the second degree of parallelism of the second component includes accessing metadata associated with a component of the computation graph.

9. A computer program, stored on a non-transitory computer-readable medium, for processing a specification of a graph-based computations, the computer program including instructions for causing a computer system to:
   accept a specification of a serial computation graph, said serial computation graph including a first component corresponding to a first data processing element and a second component corresponding to a second data processing element coupled by a link, the first component having an output connected to an input of the second component by the link;
   accept a specification of a first degree of parallelism of the first component and a second degree of parallelism of the second component;
   accept a first sort key and a second sort key, the first sort key identifying a sort order of the output of the first component and the second sort key identifying a sort order of the input of the second component;
   determine parallel characteristics of a specification of an inter-component link based at least upon the specification of the first degree of parallelism, the specification of the second degree of parallelism, the first sort key; and the second sort key;
   form the inter-component link that corresponds to the link, the inter-component link corresponding to a link data processing element that receives work elements from the first data processing element and distributes the work elements to the second data processing element according to the parallel characteristics;
   add the specification of the inter-component link to the specification of the serial computation graph; and
   execute, by a plurality of processors, a parallel computation according to the graph, including executing a plurality of instances of the first data processing element, a plurality of instances of the second data processing element, and the link data processing element such that the link data processing element receives work elements from the plurality of instances of the first data processing element and distributes the work elements to the plurality of instances of the second data processing element according to the inter-component link.

10. A computer system for processing a specification of a graph-based computations, the computer system including:
   at least one processor configured to:
      accept a specification of a serial computation graph, said serial computation graph including a first component corresponding to a first data processing element and a second component corresponding to a second data processing element coupled by a link, the first component having an output connected to an input of the second component by the link;

accept a specification of a first degree of parallelism of the first component and a second degree of parallelism of the second component;

accept a first sort key and a second sort key, the first sort key identifying a sort order of the output of the first component and the second sort key identifying a sort order of the input of the second component;

determine parallel characteristics of a specification of an inter-component link based at least upon the specification of the first degree of parallelism, the specification of the second degree of parallelism, the first sort key; and the second sort key;

form the inter-component link that corresponds to the link, the inter-component link corresponding to a link data processing element that receives work elements from the first data processing element and distributes the work elements to the second data processing element according to the parallel characteristics;

add the specification of the inter-component link to the specification of the serial computation graph; and execute, by a plurality of processors, a parallel computation according to the graph, including executing a plurality of instances of the first data processing element, a plurality of instances of the second data processing element, and the link data processing element such that the link data processing element receives work elements from the plurality of instances of the first data processing element and distributes the work elements to the plurality of instances of the second data processing element according to the inter-component link.

* * * * *

UNITED STATES PATENT AND TRADEMARK OFFICE
CERTIFICATE OF CORRECTION

PATENT NO.        : 8,866,817 B2                                  Page 1 of 1
APPLICATION NO.   : 13/295206
DATED             : October 21, 2014
INVENTOR(S)       : Craig W. Stanfill It is certified that error appears in the above-identified patent and that said Letters Patent is hereby corrected as shown below:

Title Page, Item (56) Other Publications

Page 2, col. 1, line 2, delete "Parellel" and insert -- Parallel --.

Page 2, col. 2, line 5, delete "Parellelism" and insert -- Parallelism --.

Page 2, col. 2, line 8, delete "Parellel" and insert -- Parallel --.

Page 2, col. 2, line 11, delete "Parellel" and insert -- Parallel --.

Signed and Sealed this
Seventeenth Day of February, 2015

Michelle K. Lee
*Deputy Director of the United States Patent and Trademark Office*